(12) United States Patent
Liu et al.

(10) Patent No.: US 9,727,061 B2
(45) Date of Patent: Aug. 8, 2017

(54) METHOD AND APPARATUS FOR CONTROLLING A FURNACE PRESSURE OF A CONTINUOUS ANNEALING FURNACE

(75) Inventors: Yongfeng Liu, Shanghai (CN); Huazhong Gu, Shanghai (CN); Guoqiang Qian, Shanghai (CN); Bin Yin, Shanghai (CN); Dejian Wen, Shanghai (CN); Hongxu Hei, Shanghai (CN); Jun Zhang, Shanghai (CN); Deyang Hu, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 1077 days.

(21) Appl. No.: 13/881,698

(22) PCT Filed: Apr. 14, 2011

(86) PCT No.: PCT/CN2011/072769
§ 371 (c)(1),
(2), (4) Date: Jul. 15, 2013

(87) PCT Pub. No.: WO2012/055213
PCT Pub. Date: May 3, 2012

(65) Prior Publication Data
US 2013/0304263 A1    Nov. 14, 2013

(30) Foreign Application Priority Data

Oct. 26, 2010  (CN) .......................... 2010 1 0519941

(51) Int. Cl.
*G05D 16/20* (2006.01)
*F27D 19/00* (2006.01)
(Continued)

(52) U.S. Cl.
CPC .............. *G05D 16/20* (2013.01); *C21D 1/74* (2013.01); *C21D 9/561* (2013.01); *C21D 11/00* (2013.01);
(Continued)

(58) Field of Classification Search
CPC .. F27D 19/00; F27D 21/00; F27D 2019/0031; G05D 16/20; C21D 9/561; C21D 11/00; C21D 1/74
See application file for complete search history.

(56) References Cited

U.S. PATENT DOCUMENTS

| | | | |
|---|---|---|---|
| 6,779,735 B1* | 8/2004 | Onstott | ................ F24F 12/006 165/248 |
| 2008/0053348 A1* | 3/2008 | Bardi | ........................ F23G 5/50 110/344 |
| 2009/0271039 A1* | 10/2009 | Richman | .................. F23J 15/02 700/274 |

FOREIGN PATENT DOCUMENTS

| | | |
|---|---|---|
| CN | 201250261 Y | 6/2009 |
| JP | 59-038341 A | 3/1984 |
| JP | 2004-183039 A | 6/2004 |

OTHER PUBLICATIONS

International Search Report from PCT/CN2011/072769, dated Aug. 11, 2011 (English Translation version).
(Continued)

*Primary Examiner* — Shogo Sasaki
(74) *Attorney, Agent, or Firm* — Kilpatrick Townsend & Stockton LLP (57) ABSTRACT

A method for controlling furnace pressure of a continuous annealing furnace is disclosed. The method comprises detecting a coal gas flow volume and an air flow volume in each section by use of a coal gas flow volume detector and an air flow volume detector disposed in each section of a continuous annealing furnace, respectively, adding up the coal gas flow volume detected in each section to obtain a total input coal gas flow volume; adding up the air flow volume detected in each section to obtain a total input air flow volume, and calculating a pre-combustion gas pressure in the furnace based on the total input coal gas flow volume
(Continued)

and the total input air flow volume; detecting compositions of the coal gas and a ratio of the coal gas to the air by use of a composition detector; detecting a pre-combustion gas temperature in the furnace by use of a thermocouple; predicting post-combustion gas compositions and a total gas volume based on chemical combustion reaction equations and based on the total input coal gas flow volume, the total input air flow volume, the coal gas compositions and the ratio of the coal gas to the air; igniting the coal gas and the air in the furnace; and detecting a post-combustion gas temperature in the furnace by use of a thermocouple; calculating a post-combustion gas pressure in the furnace based on the pre-combustion gas pressure in the furnace, pre-combustion gas temperature in the furnace and the post-combustion gas temperature in the furnace; and calculating an opening degree for an exhaust gas fan based on the pre-combustion gas pressure in the furnace and the post-combustion gas pressure in the furnace and by use of a gas increment pass algorithm, and using the opening degree to control the exhaust gas fan.

3 Claims, 4 Drawing Sheets (51) Int. Cl.
F27D 21/00 (2006.01)
C21D 1/74 (2006.01)
C21D 9/56 (2006.01)
C21D 11/00 (2006.01)

(52) U.S. Cl.
CPC .............. F27D 19/00 (2013.01); F27D 21/00 (2013.01); F27D 2019/0031 (2013.01)

(56) References Cited

OTHER PUBLICATIONS

Liu et al.; "Research and Application of Combustion Control for Annealing Furnace"; *Metal World*; No. 3, (Jun. 2007), abstract.
Wang et al.; "PLC Control of a Continuous Annealing Furnace"; *Techniques of Automation & Applications*; 25(10): (2006), abstract.
Zhang et al.; "Exploitation of Intelligent Fuzzy Controller for Furnace Temperature With Feedforward Correction"; *Journal of Iron and Steel Research*; 18(12): (2006), abstract.

* cited by examiner

METHOD AND APPARATUS FOR CONTROLLING A FURNACE PRESSURE OF A CONTINUOUS ANNEALING FURNACE

FIELD OF THE INVENTION

The present invention relates to the field of smelting apparatus, and in particular, to a method and apparatus for controlling a furnace pressure of a continuous annealing furnace.

BACKGROUND OF THE INVENTION

Figure 3:
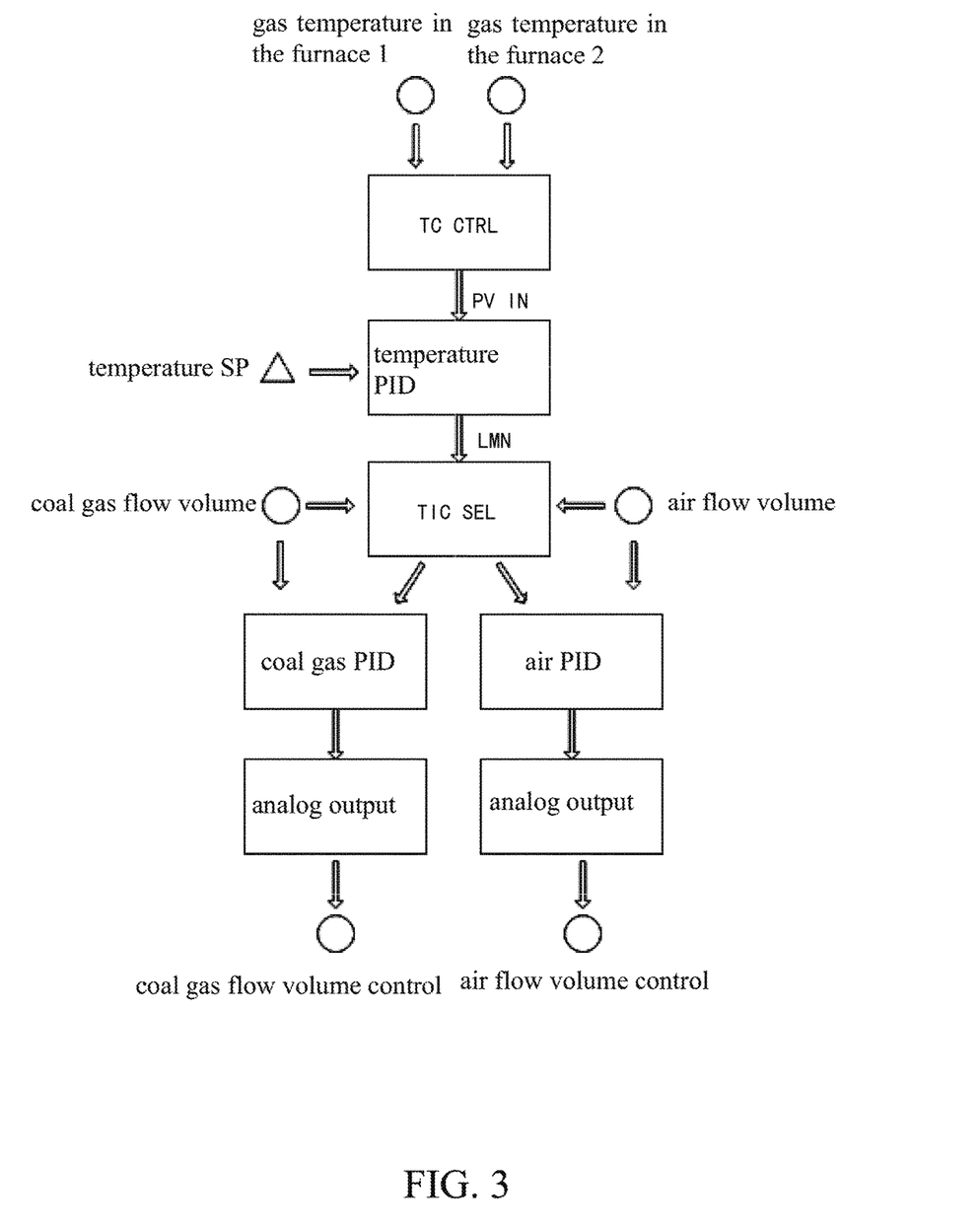
FIG. 3 illustrates the control logic of a conventional PID double cross amplitude limiting control method for controlling a furnace pressure of a continuous annealing furnace.

The pressure in an annealing furnace is an important control indicator. A fluctuating furnace pressure may have great influence on quality and performance of the products. A very low furnace pressure may cause the air to enter the oxidized strip steel, and a very high furnace pressure may make exhaust gas flow into the next furnace section so as to affect atmosphere in the furnace. The whole heating furnace for continuous annealing is divided into several sections, and each section is controlled independently, for example, in terms of coal gas flow volume, temperature and pressure. The furnace temperature of currently commonly-used annealing furnaces is mostly controlled by a double cross amplitude limiting control method. Both the flow volume of the coal gas and the flow volume of the air volume entering into the furnace vary with different powers to be needed, which causes the volume of exhaust gas generated by combustion in the furnace to be always varying, and thereby to give rise to fluctuation of furnace pressure. At present and in general, it is common to employ conventional PID double cross amplitude limiting control method to control furnace pressure of the existing continuous annealing furnaces. A schematic diagram of control logic of the conventional PID double cross amplitude limiting control method of furnace pressure is shown in FIG. 3. Its control process is: furnace temperature is measured by two thermocouples respectively, the higher one of the two measurements is taken as significant and sent to be compared to the set value of furnace temperature, the difference between the measured and the set value is taken as a input to PID control module; after making an operation, the PID control module outputs a control signal to the double cross amplitude limiting control module for it to make operation; the double cross amplitude limiting control module calculates new set values of coal gas flow volume and air flow volume and compares the new set values to their actual values and educes differences between the new set values and the actual values, respectively, and then sends the differences to PID module of the coal gas and PID module of the air, respectively; after making operation, the PID module of the coal gas and PID module of the air send a signal standing for necessary regulation of coal gas control valve and a signal standing for necessary regulation of air control valve to their actuators, respectively; and finally, the actuators of both coal gas control valve and air control valve adjust the valves so as to make the current actual values of coal gas flow volume and air flow volume corresponding to the new set values respectively. During regulation, the coal gas flow volume and air flow volume entering into the furnace are always varying. A continuous annealing furnace is equipped with many burners, every burner's load is constantly changed, and the volume of the coal gas and air in the furnace is always varying in a relatively large range, moreover, transmission of furnace pressure to measure points takes a little time, furthermore, annealing furnace has a big inertia and a nature of lagging. For all these reasons, the conventional furnace pressure control of continuous annealing furnaces fails to meet the needs of both the stability of the furnace pressure and the fast speed of regulation.

SUMMARY OF THE INVENTION

The object of the invention is to provide a method and apparatus for controlling a furnace pressure of a continuous annealing furnace, considering the impact of thermal expansion of gas on the furnace pressure.

The basic control logic of the control method and control apparatus according to the present invention is to take the set values of all temperature, burner power, coal gas flow volume and air flow volume input into sections of the furnace and their actual values as inputs, to calculate a current optimum rotating speed of an exhaust gas fan by use of a multi-variable prediction control algorithm, and to realize control of furnace pressure by use of combination between the current optimum rotating speed of the exhaust gas fan and the opening degree of a regulation valve. By calculating the effect of volume variation of the gas in the furnace before and after combustion on furnace pressure and taking account of the effect of thermal expansion of the gas in the furnace on the furnace pressure, the control method and control apparatus can improve control accuracy and dynamic response of furnace pressure.

In one aspect of the invention, there is provided a method for controlling a furnace pressure of a continuous annealing furnace which comprises the following steps:

detecting a coal gas flow volume and an air flow volume in each section by use of a coal gas flow volume detector and an air flow volume detector disposed in each section of a continuous annealing furnace, respectively, adding up the coal gas flow volume detected in each section to obtain a total input coal gas flow volume, adding up the air flow volume detected in each section to obtain a total input air flow volume, and calculating a pre-combustion gas pressure in the furnace based on the total input coal gas flow volume and the total input air flow volume;

detecting compositions of the coal gas and a ratio of the coal gas to the air by use of a composition detector;

detecting a pre-combustion gas temperature in the furnace by use of a thermocouple;

predicting post-combustion gas compositions and a total gas volume based on chemical combustion reaction equations and based on the total input coal gas flow volume, the total input air flow volume, the coal gas compositions and the ratio of the coal gas to the air;

igniting the coal gas and the air in the furnace, and detecting a post-combustion gas temperature in the furnace by use of a thermocouple;

calculating a post-combustion gas pressure in the furnace based on the pre-combustion gas pressure in the furnace, pre-combustion gas temperature in the furnace and the post-combustion gas temperature in the furnace; and calculating an opening degree for an exhaust gas fan based on the pre-combustion gas pressure in the furnace and the post-combustion gas pressure in the furnace and by use of a gas increment pass algorithm, and using the opening degree to control the exhaust gas fan.

In another aspect of the invention, there is provided an apparatus for controlling a furnace pressure of a continuous annealing furnace which comprises the following devices:

coal gas flow volume detectors, each disposed in each section of the continuous annealing furnace and configured to detect a coal gas flow volume in each section, respectively;

air flow volume detectors, each disposed in each section of the continuous annealing furnace and configured to detect an air flow volume in each section, respectively;

a computing unit for computing a total gas volume in the furnace, wherein the computing unit is coupled to both the coal gas flow volume detectors and the air flow volume detectors, and the computing unit for computing the total gas volume in the furnace is configured to add up the coal gas flow volume in each section to obtain a total input coal gas flow volume, and add up the air flow volume in each section to obtain a total input air flow volume;

a composition detector, configured to detect compositions of the coal gas and ratio of the coal gas to the air;

a thermocouple, configured to detect temperature of the gas in the furnace;

a combustion prediction unit, coupled to the computing unit for computing gas pressure in the furnace and to the composition detector, and configured to predict compositions of the post-combustion gas and total volume of the post-combustion gas by used of chemical combustion reaction equations and based on the total input coal gas flow volume, the total input air flow volume, the coal gas compositions and the ratio of the coal gas to the air;

an igniter, configured to ignite the coal gas and the air in the furnace;

the computing unit for computing gas pressure in the furnace, coupled to the computing unit for computing the total gas volume in the furnace and configured to calculate a pre-combustion gas pressure in the furnace based on the total input coal gas flow volume and the total input air flow volume before combustion, wherein the computing unit for computing gas pressure in the furnace is further coupled to the thermocouple and is configured to calculate a post-combustion gas pressure in the furnace based on the pre-combustion gas pressure in the furnace, a pre-combustion gas temperature in the furnace and a post-combustion gas temperature in the furnace;

an exhaust gas fan opening degree controller, coupled to both the computing unit for computing gas pressure in the furnace and an exhaust gas fan, and is configured to calculate an opening degree for the exhaust gas fan based on both the pre-combustion gas pressure in the furnace and the post-combustion gas pressure in the furnace and by use of a gas increment pass algorithm, wherein the exhaust gas fan opening degree controller utilizes the opening degree to control the exhaust gas fan.

In the conventional control solutions for continuous annealing furnaces, only PID controller is adopted. In this control mode, conduct regulation is conducted by virtue of feedback, which will unavoidably resulting in lagging or overshoot of regulation. In view of this, an apparatus for controlling furnace pressure of a continuous annealing furnace according to the present invention is provided with a feedforward control element. With such a control apparatus, based on the coal gas flow volume and air flow volume of the sections of a continuous annealing furnace (the coal gas flow volume and the air flow volume shall be matched in chemical combustion reaction so as to have no extra oxygen which may oxygenize the object to be annealed), it is possible to calculate volume of exhaust gas to be generated by combustion and an optimum speed of exhaust gas fan which is necessary to maintain the set value of furnace pressure. When adjusting furnace pressure, the controller of exhaust gas fan controls directly the exhaust gas fan so as to make it run at the optimum speed. In these control actions, it is possible to make furnace pressure response to control actions rapidly and to reduce overshoots greatly so as to maintain a stable furnace pressure.

DETAILED DESCRIPTION OF THE INVENTION

Figure 1:
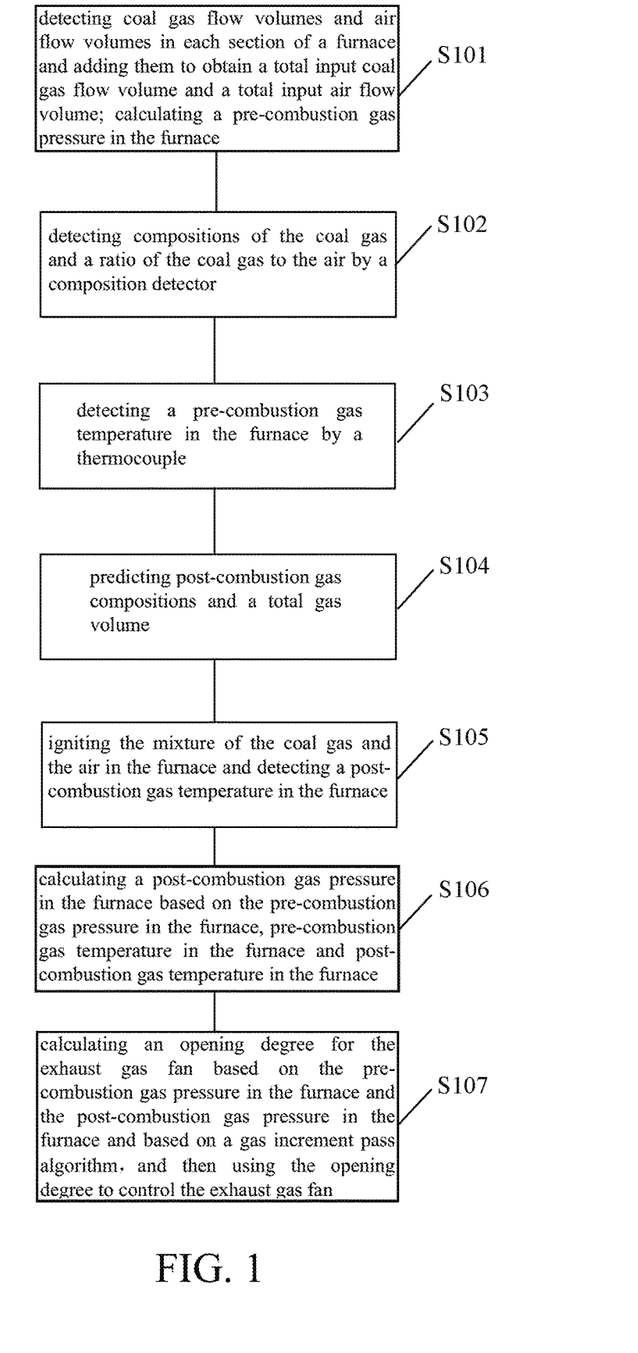
FIG. 1 is a flow diagram of a method for controlling a furnace pressure of a continuous annealing furnace according to the present invention.

Referring to FIG. 1, a method for controlling furnace pressure of a continuous annealing furnace is shown according to the present invention. The method comprises the following steps:

S101: detecting a coal gas flow volume and an air flow volume in each section by use of a coal gas flow volume detector and an air flow volume detector disposed in each section of a continuous annealing furnace, respectively, summing up the coal gas flow volume detected in each section to obtain a total input coal gas flow volume, summing up the air flow volume detected in each section to obtain a total input air flow volume, and calculating a pre-combustion gas pressure in the furnace based on the total input coal gas flow volume and the total input air flow volume.

In one embodiment, the total input coal gas flow volume $V_{gas}$ and the total input air flow volume $V_{air}$ are calculated by the following expressions:

$$V_{gas}=V_{g1}+V_{g2}+\ldots+V_{gn};$$

$$V_{air}=V_{a1}+V_{a2}+\ldots+V_{an}$$

wherein:

$V_{gas}$ denotes the total input coal gas flow volume;

$V_{gn}$ denotes the coal gas flow volume detected in the n-th section;

$V_{air}$ denotes the total input air flow volume;

$V_{an}$ denotes the air flow volume detected in the n-th section.

After obtaining the total input coal gas flow volume $V_{gas}$ and the total input air flow volume $V_{air}$, the internal volume of the continuous annealing furnace is measured. The total volume V1 of the coal gas and the air is calculated based on the total input coal gas flow volume $V_{gas}$ and total input air flow volume $V_{air}$ so as to derive pre-combustion pressure P1 in the furnace.

S102: detecting the compositions of the coal gas and the ratio of the coal gas to the air by use of composition detectors. For example, in one embodiment, the detected compositions of the coal gas includes: $H_2$: 57.78%, $O_2$: 0.61%, $N_2$: 4.54%, $CH_4$: 24.80%, CO: 6.47%, $CO_2$: 2.87, $C_2H_4$: 0.68, $C_3H_6$: 0.2. The ratio of the coal gas to the air is 1:4. Usually, the ratio of the coal gas to the air is set to be 1:4 or so in advance and depending on the need of an anneal process. In this step, the ratio of the coal gas to the air is verified again by the composition detector.

S103: detecting and obtaining the pre-combustion gas temperature T1 in the furnace by means of thermocouples.

S104: predicting post-combustion gas compositions and total volume V2 of the gas generated by combustion by use of chemical combustion reaction equations and based on the total input coal gas flow volume, the total input air flow volume, the coal gas compositions and the ratio of the coal gas to the air.

In one embodiment, the chemical combustion reaction equations include:

$$2H_2+O_2=2H_2O;$$

$$CH_4+2O_2=2H_2O+CO_2;$$

$$2CO+O_2=2CO_2;$$

$$C_2H_4+3O_2=2CO_2+2H_2O;$$

$$2C_2H_6+7O_2=4CO_2+6H_2O;$$

$$2C_3H_6+9O_2=6CO_2+6H_2O.$$

By use of the above chemical combustion reaction equations and based on the total input coal gas flow volume, the total input air flow volume, the coal gas compositions and the ratio of the coal gas to the air, it is possible to accurately predict the post-combustion gas compositions and total flow volume V2 of the post-combustion gas.

S105: igniting the mixture of the coal gas and air in the furnace and detecting post-combustion gas temperature T2 in the furnace by means of thermocouples.

S106: calculating a post-combustion gas pressure in the furnace based on the pre-combustion gas pressure in the furnace, the pre-combustion gas temperature in the furnace and the post-combustion gas temperature in the furnace.

The heat generated by combustion makes the temperature of exhaust gas in the furnace rise, and simultaneously, the exhaust gas is heated to expand by the inherit temperature in the furnace. By use of thermodynamic equation P1V1/T1=P2V2/T2, it is possible to calculate the post-combustion gas pressure in the furnace, wherein P1 is the pre-combustion gas pressure in the furnace; V1 is the pre-combustion gas volume in the furnace; T1 is the pre-combustion gas temperature in the furnace; P2 is the post-combustion gas pressure in the furnace; V2 is the post-combustion gas volume in the furnace; and T2 is the post-combustion gas temperature in the furnace. Of them, P1 and V1 are derived from step S101, T1 is derived from step S103, V2 is derived from step S104, T2 is derived from S105, and the post-combustion gas pressure P2 in the furnace is calculated in step S106.

S107: calculating an opening degree for an exhaust gas fan based on the pre-combustion gas pressure P1 in the furnace and the post-combustion gas pressure P2 in the furnace and by use of a gas increment pass algorithm, and using the opening degree to control the exhaust gas fan.

In one embodiment, the gas increment pass algorithm includes calculating the gas increment FAN DISV by means of the following equation:

FAN_DISV=((Flow_air+Flow_air/
(Flow_gas*Gas_air))*Burn_Parameter+(Flow_
gas−Flow_air/(Flow_gas*Gas_air))+Nflow_1)*
(temp_pv+273.15)/(Fan_Flow_
Max*273.15)*100;

wherein Flow_air is the air flow volume, Flow_gas is the coal gas flow volume, Burn_Parameter is parameter of burners, Gas_air is the ratio of coal gas to air, Fan_Flow_Max is the maximum of the flow volume of the fan, temp_pv is actual temperature in the furnace, and Nflow-1 is a preset flow volume as a reference.

The opening degree of the exhaust gas fan derived in step S107 can have a pre-control effect on furnace pressure. When adjusting furnace pressure, the opening degree of the exhaust gas fan is directly output to the exhaust gas fan so as to enable the exhaust gas fan to reach the desired opening degree, and then fine adjustment is conducted by PID regulator of an exhaust gas valve, and the regulation action of the optimum rotating speed and the regulation action of fine adjustment of the exhaust gas valve are superposed, and the superposition of the two is taken as the final value set for the exhaust gas fan. By all these control actions, it is possible to make furnace pressure respond to control actions rapidly and to reduce overshoots greatly so as to maintain a stable furnace pressure.

Figure 2:
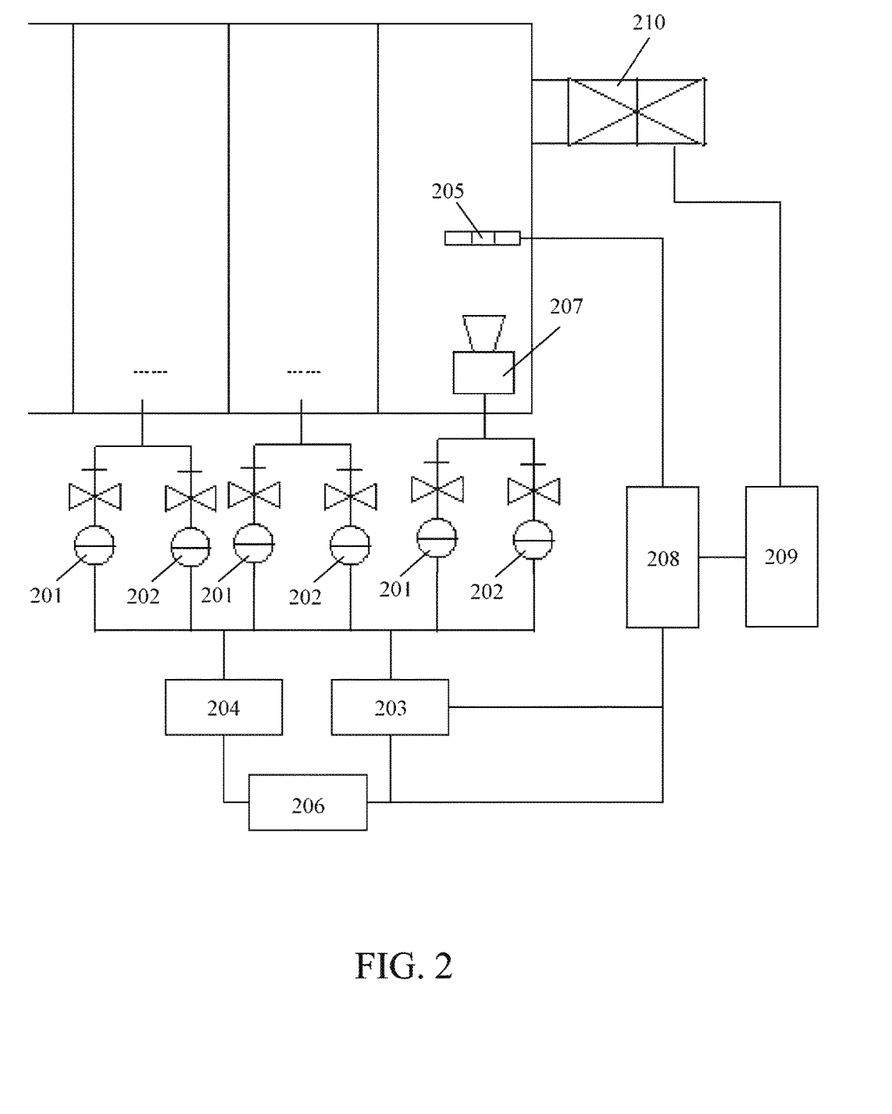
FIG. 2 is a schematic diagram of the apparatus for controlling a furnace pressure of a continuous annealing furnace according to the present invention.

The invention also provides an apparatus for controlling furnace pressure of a continuous annealing furnace, as is shown in FIG. 2. The system comprises coal gas flow volume detectors 201, air flow volume detectors 202, a computing unit 203 for computing a total gas volume in the furnace, a composition detector 204, a thermocouple 205, a combustion prediction unit 206, an igniter 207, a computing unit 208 for computing a gas pressure in the furnace, an exhaust gas fan opening degree controller 209, and an exhaust gas fan 210.

The coal gas flow volume detectors 201 each are disposed in each section of the furnace and used to detect the coal gas flow volume of each section, respectively.

The air flow volume detectors 202 each are disposed in each section of the furnace and used to detect the air flow volume of each section, respectively.

The computing unit 203 for computing the total gas volume in the furnace is connected to both the coal gas flow volume detectors 201 and the air flow volume detectors 202. The computing unit 203 adds the coal gas flow volumes detected in each section and obtains a total input coal gas flow volume, and also adds the air flow volumes detected in each section and obtains a total input air flow volume. In one embodiment, the total input coal gas flow volume $V_{gas}$ and the total input air flow volume $V_{air}$ are calculated by the following expressions:

$$V_{gas}=V_{g1}+V_{g2}+\ldots+V_{gn};$$

$$V_{air}=V_{a1}+V_{a2}+\ldots+V_{an}$$

wherein:
$V_{gas}$ denotes the total input coal gas flow volume;
$V_{gn}$ denotes the coal gas flow volume detected in the n-th section;
$V_{air}$ denotes the total input air flow volume;
$V_{an}$ denotes the air flow volume detected in the n-th section.

After obtaining the total input coal gas flow volume $V_{gas}$ and the total input air flow volume $V_{air}$, the internal volume of the continuous annealing furnace is measured. The total volume V1 of the coal gas and the air is calculated based on the total input coal gas flow volume $V_{gas}$ and total input air flow volume $V_{air}$ so as to derive pre-combustion pressure P1 in the furnace.

The composition detector 204 is used to detect both the compositions of the coal gas and the ratio of the coal gas to the air. In one embodiment, the detected compositions of the coal gas include $H_2$: 57.78%, $O_2$: 0.61%, $N_2$: 4.54%, $CH_4$: 24.80%, CO: 6.47%, $CO_2$: 2.87%, $C_2H_4$: 0.68, $C_3H_6$: 0.2. The ratio of the coal gas to the air is 1:4. Usually, the ratio of the coal gas to the air is set in advance and depending on the need of an annealing process. The ratio of the coal gas to the air is verified again by the composition detector 204.

The thermocouple 205 is used to detect gas temperature in the furnace.

The combustion prediction unit 206 is connected to the computing unit 203 and composition detector 204. Post-combustion gas compositions and total gas volume V2 of the post-combustion gas can be predicted by use of chemical combustion reaction equations and based on the total input coal gas flow volume, the total input air flow volume, the coal gas compositions and the ratio of the coal gas to the air.

In one embodiment, the chemical combustion reaction equations include:

$$2H_2+O_2=2H_2O;$$

$$CH_4+2O_2=2H_2O+CO_2;$$

$$2CO+O_2=2CO_2;$$

$$C_2H_4+3O_2=2CO_2+2H_2O;$$

$$2C_2H_6+7O_2=4CO_2+6H_2O;$$

$$2C3H6+9O2=6CO2+6H2O$$

By use of the above chemical combustion reaction equations and based on the total input coal gas flow volume, the total input air flow volume, the coal gas compositions and the ratio of the coal gas to the air, it is possible to accurately predict the post-combustion gas compositions and total gas volume V2 of post-combustion gas.

The igniter 207 disposed in the furnace is used to ignite the mixture of the coal gas and the air in the furnace.

The computing unit 208 for computing gas pressure in the furnace is connected to the computing unit 203 for computing the total gas volume in the furnace, and used to compute a pre-combustion gas pressure in the furnace based on the total input coal gas flow volume and the total input air flow volume. The computing unit 208 is also connected to the thermocouple 205 and the combustion prediction unit 206, and is used to compute a post-combustion gas pressure in the furnace based on pre-combustion gas pressure in the furnace, the pre-combustion gas temperature in the furnace and the post-combustion gas temperature in the furnace. The heat generated by combustion makes exhaust gas temperature rise, and simultaneously, the exhaust gas is heated to expand by the inherit temperature in the furnace. By use of thermodynamic equation $P1V1/T1=P2V2/T2$, it is possible to calculate the gas pressure in the furnace after the coal gas and the air have combusted, wherein P1 is the pre-combustion gas pressure in the furnace; V1 is the pre-combustion gas volume in the furnace; T1 is the pre-combustion gas temperature in the furnace; P2 is the post-combustion gas pressure in the furnace; V2 is the post-combustion gas volume in the furnace; and T2 is the post-combustion gas temperature in the furnace. Among them, P1 and V1 are obtained by the computing unit 203 for computing total gas volume in the furnace. T1 is obtained by the thermocouple 205. V2 is obtained by the combustion prediction unit 206. T2 is also obtained by the thermocouple 205. The post-combustion gas pressure P2 in the furnace is calculated and given by the computing unit 208 for computing gas pressure in the furnace.

The exhaust gas fan opening degree controller 209 is coupled to the computing unit 208 for computing gas pressure in the furnace and the exhaust gas fan 210, and is used to calculate an opening degree for the exhaust gas fan based on the pre-combustion gas pressure P1 in the furnace and the post-combustion gas pressure P2 in the furnace and based on a gas increment pass algorithm. The opening degree is used to control the exhaust gas fan 210.

In one embodiment, the gas increment pass algorithm includes calculating the gas increment FAN_DISV based on the following equation:

FAN_DISV=((Flow_air+Flow_air/
(Flow_gas*Gas_air))*Burn_Parameter+(Flow_
gas−Flow_air/(Flow_gas*Gas_air))+Nflow_1)*
(temp_pv+273.15)/(Fan_Flow_
Max*273.15)*100, wherein Flow_air is the air flow volume, Flow_gas is the coal gas flow volume, Burn_Parameter is the parameter of burners, Gas_air is the ratio of the coal gas to the air, Fan_Flow_Max is the maximum of the flow volume of the fan, temp_pv is an actual temperature in the furnace, and Nflow-1 is a preset flow volume as a reference.

The opening degree of the exhaust gas fan derived by the exhaust gas fan opening degree controller 209 can have a pre-control effect on furnace pressure. When adjusting furnace pressure, the opening degree of the exhaust gas fan is directly output to the exhaust gas fan so as to enable the exhaust gas fan to reach the desired opening degree, and then fine adjustment is conducted by PID regulator of an exhaust gas valve, and the regulation action of the optimum rotating speed and the regulation action of fine adjustment of the exhaust gas valve are superposed, and the superposition of the two is taken as the final value set for the exhaust gas fan. By all these control actions, it is possible to make furnace pressure respond to control actions rapidly and to reduce overshoots greatly so as to maintain a stable furnace pressure.

Figure 4:
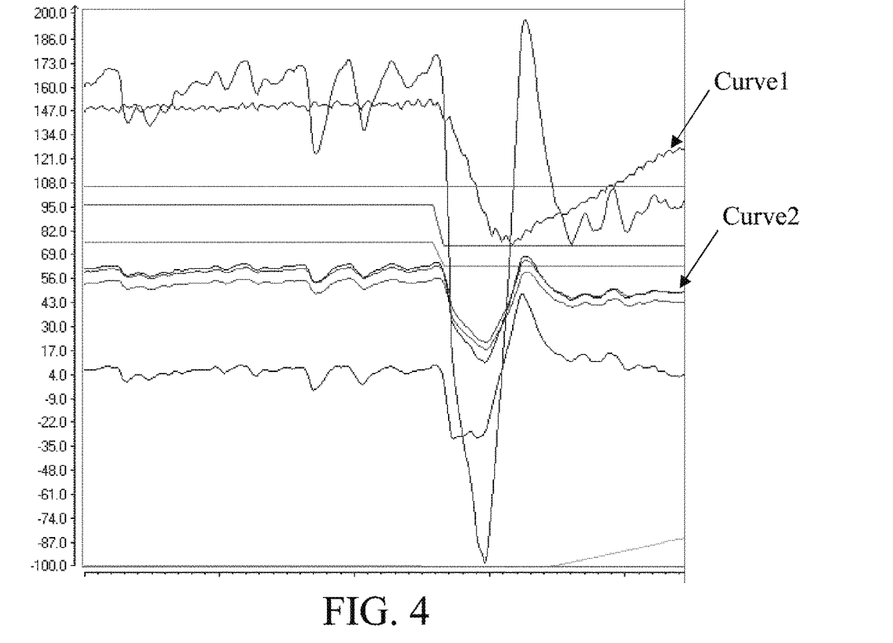
FIG. 4 shows a graph of furnace pressure in the case of using a conventional control method.
Figure 5:
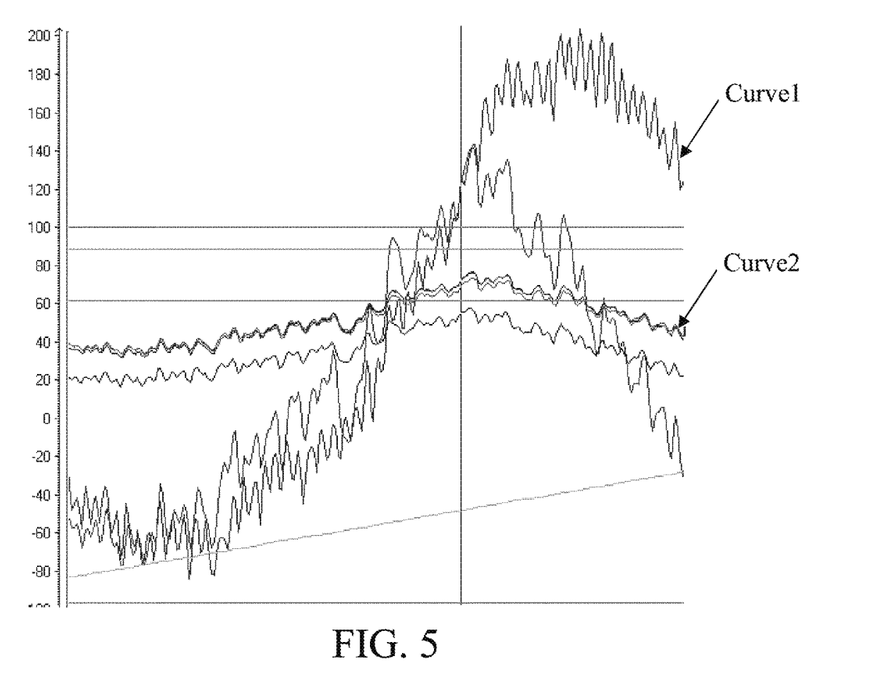
FIG. 5 shows a graph of furnace pressure in the case of using the control method and control apparatus of the present invention.

FIG. 4 and FIG. 5 illustrate graphs of furnace pressure variation given by different control methods. Among them, FIG. 4 shows a graph of furnace pressure variation in accordance with a conventional control method and FIG. 5 shows a graph of furnace pressure variation in accordance with the control method and control apparatus of the present invention.

In FIG. 4, curve 1 shows the air flow volume. The variation tendency of the coal gas flow volume is basically the same because the ratio of the coal gas to the air is essentially a constant. When the flow volumes of both coal gas and air are reduced, furnace pressure (curve 2) reduces simultaneously because control and regulation action is not conducted rapidly enough, and finally the exhaust gas valve is overly turned down, which gives rise to such an overshoot phenomenon that the furnace pressure rushes up to 70 Pa and then causes fluctuation of the furnace pressure.

In FIG. 5, with the regulation conducted by the feedforward module provided by the present invention, the furnace pressure (curve 2) fluctuates slightly within 20 Pa without resulting in negative pressure even if the air flow volume (curve 1) varies significantly.

In the conventional control solutions of continuous annealing furnaces, only PID controller is adopted. This control mode to conduct regulation by virtue of feedback will unavoidably result in lagging and overshoot of regulation. In view of this, an apparatus for controlling furnace pressure of a continuous annealing furnace with a feedforward control element is provided according to the present invention. With such a control apparatus, based on the gas flow volume and air flow volume of the sections of a continuous annealing furnace (the coal gas flow volume and the air flow volume shall be matched in chemical reaction of combustion so as to have no extra oxygen which may oxygenize the object to be annealed), it is possible to calculate the volume of the exhaust gas and an opening degree of the exhaust gas fan which is necessary to maintain the set value of furnace pressure. When adjusting furnace pressure, the opening degree for the exhaust gas fan is directly output to the valve so as to enable the valve to reach the desired opening degree. Then, PID regulation is used for fine adjustment. By these control actions, it is possible to make furnace pressure respond to the control actions rapidly and to reduce overshoots greatly so as to maintain a stable furnace pressure.

The invention claimed is:

1. A method for controlling a furnace pressure of a continuous annealing furnace having sections characterized in comprising:

detecting a coal gas flow volume and an air flow volume in each section by use of a coal gas flow volume detector and an air flow volume detector disposed in each of the sections of a continuous annealing furnace, respectively, adding up the coal gas flow volume detected in each of the sections to obtain a total input coal gas flow volume, adding up the air flow volume detected in each of the sections to obtain a total input air flow volume, and calculating a pre-combustion gas pressure in the furnace based on the total input coal gas flow volume and the total input air flow volume;

detecting compositions of the coal gas and a ratio of the coal gas to the air by use of a composition detector;

detecting a pre-combustion gas temperature in the furnace by use of a thermocouple;

predicting post-combustion gas compositions and a total gas volume based on chemical combustion reaction equations and based on the total input coal gas flow volume, the total input air flow volume, the coal gas compositions and the ratio of the coal gas to the air;

igniting the coal gas and the air in the furnace, and detecting a post-combustion gas temperature in the furnace by use of a thermocouple;

calculating a post-combustion gas pressure in the furnace based on the pre-combustion gas pressure in the furnace, the pre-combustion gas temperature in the furnace and the post-combustion gas temperature in the furnace; and calculating an opening degree for an exhaust gas fan based on the pre-combustion gas pressure in the furnace and the post-combustion gas pressure in the furnace and by use of a gas increment pass algorithm, and using the opening degree to control the exhaust gas fan where the increment pass algorithm includes calculating an increment FAN_DISV of the gas based on the following equation, FAN_DISV=((Flow_air+Flow_air/(Flow_gas*Gas_air))*Burn_Parameter+(Flow_gas-Flow_air/(Flow_gas*Gas_air))+*N*flow_1)*(temp_*pv*+273.15)/(Fan_Flow_Max*273.15)*100;

wherein Flow_air is the air flow volume, Flow_gas is the coal gas flow volume, Burn_Parameter is parameter of burners, Gas_air is the ratio of the coal gas to the air, Fan_Flow_Max is the maximum of the flow volume of the fan, temp_pv is actual temperature in the furnace, and Nflow-1 is a preset flow volume as a reference.

2. The method of claim 1, characterized in that, the compositions of the coal gas comprises 57.78% of $H_2$, 0.61% of $O_2$, 4.54% of $N_2$, 24.80% of $CH_4$, 6.47% of CO, 2.87 of $CO_2$, 0.68 of $C_2H_4$, 0.2 of $C_3H_6$.

3. The method of claim 1, characterized in that, the chemical combustion reaction equations include:

$$2H_2+O_2=2H_2O;$$

$$CH_4+2O_2=2H_2O+CO_2;$$

$$2CO+O_2=2CO_2;$$

$$C_2H_4+3O_2=2CO_2+2H_2O;$$

$$2C_2H_6+7O_2=4CO_2+6H_2O;$$

$$2C3H6+9O2=6CO2+6H2O.$$

* * * * *